United States Patent Office 2,826,582
Patented Mar. 11, 1958

2,826,582

PREPARATION OF QUATERNARY AMMONIUM HALIDES

Edsel L. Miller, Ponca City, Okla., assignor to Continental Oil Company, Ponca City, Okla., a corporation of Delaware No Drawing. Application October 10, 1955
Serial No. 539,657

8 Claims. (Cl. 260—290)

This invention relates to an improved process for the production of quaternary ammonium halides. More particularly the invention relates to an improved process for the production of stable quaternary ammonium halides in improved yields which are nonacidic and substantially free of objectionable odors.

Quaternary ammonium halides are well known to the art. They are conventionally prepared by condensing an alkbenzyl halide with a tertiary-amine in the presence of water and for the most part may be illustrated by the formula:

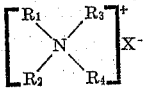

in which at least one of the groups $R_1$, $R_2$, $R_3$, and $R_4$ is a hydrophobic organic group and the remaining groups are alkyl, aryl or substituted alkyl or aryl radicals and may be the same or different, and the radical X is a halogen atom.

Since the germicidal activity of a quaternary ammonium halide is best within a pH range of 7 to 8.5, it is generally necessary to treat the condensation product with an alkaline material to give the desired pH. When the condensation product is made alkaline, substantial amounts of the tertiary-amine are liberated which is immediately apparent because of its characteristic and offensive fish-like odor, thus making quaternary ammonium halides disagreeable. In addition these liberated tertiary-amines are essentially non-germicidal and act as contaminants.

It has been proposed in the prior art to overcome the foregoing objection by condensing the alkaryl halide and the tertiary-amine in the presence of water and about .1 to 10 percent by weight of an alkali metal bicarbonate based on the total organic halide and tertiary-amine present. The quaternary ammonium halide produced by the latter process is substantially free of objectionable odors when freshly made but upon standing any length of time, particularly in the presence of warm water, a certain amount of tertiary-amines are liberated, imparting to the product a disagreeable and fish-like odor.

It is, therefore, a principal object of the present invention to provide a process for the production of quaternary ammonium halides which method obviates the disadvantages of the prior art processes. It is a further object of my invention to provide a method by which germicidal quaternary ammonium halides may be produced in improved yields. It is another object of the present invention to produce quaternary ammonium halides which are non-acidic. Yet another object of my invention is to provide a process for the production of quaternary ammonium halides which are substantially free of disagreeable odor and will remain so upon storage. Other objects and advantages of the invention will be apparent from the description which follows.

To the accomplishment of the foregoing and related ends, the invention then consists of the means hereinafter fully described and particularly pointed out in the claims, the following description setting forth in detail certain approved combinations of ingredients embodying my invention, such disclosed means constituting, however, but one of the various forms in which the principle of the invention may be used.

In brief, I have discovered that quaternary ammonium halides may be produced which are substantially odorless and will remain substantially odorless even upon storage in the presence of water by condensing the alkbenzyl halide with a tertiary-amine in the presence of water, alcohol or solutions of the two, and about .25 to 15 weight percent based upon the total weight of the alkbenzyl halide and tertiary-amine present of an alkali metal salt of an acid selected from the group consisting of boric and acetic acids.

Before proceeding with specific examples illustrating my invention, it may be well to indicate in general the nature of the materials required in the process.

Although almost any tertiary-amine may be used, I prefer those containing not more than a total of 12 carbon atoms, specific examples of which are trimethylamine, triethylamine, triethanolamine, dimethylbenzylamine, diethylethanolamine, pyridine, methyl morpholine, ethyl morpholine, etc.

Suitable alkbenzyl halides are those illustrated by the general formula:

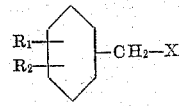

in which $R_1$ is an alkyl radical, $R_2$ is an alkyl radical or hydrogen, and X is a halogen atom. Suitable alkbenzyl halides for use in my invention may vary widely as to carbon atom content. As for example, the carbon atom content of the alkbenzyl halide is dependent to a certain degree upon the specific tertiary amine employed. If a relative low molecular weight tertiary amine such as trimethylamine is used, the alkbenzyl halide desirably contains 12 to 18 carbon atoms to give a quaternary ammonium halide having the required hydrophobic properties. Conversely, if a high molecular weight tertiary amine is used, an alkbenzyl halide containing a smaller number of carbon atoms may be employed. Specific alkbenzyl halides that are particularly effective in the process of my invention are those prepared from the products known as dodecylbenzene, dodecyltoluene, and polydodecylbenzene.

Dodecylbenzene is obtainable from Continental Oil Company under the trade name of Neolene 400. Physical properties of Neolene 400 are as follows:

| | |
|---|---|
| Specific gravity at 16° C | 0.8742 |
| Average molecular weight | 232 |
| A. S. T. M., D-158 Engler: | |
| I. B. P. °F | 535 |
| 5 °F | 545 |
| 10 °F | 550 |
| 50 °F | 560 |
| 90 °F | 580 |
| 97 °F | 592 |
| F. B. P. °F | 603 |
| Refractive index at 20° C | 1.4885 |
| Viscosity at 20° C centipoises | 14 |
| Bromine number | 0.16 |

Polydodecylbenzene consists of monoalkylbenzenes and dialkylbenzenes in the approximate ratio of 2:3. Its typical physical properties are as follows:

| | |
|---|---|
| Specific gravity at 38° C | 0.8649 |
| Average molecular weight | 365 |
| Percent sulfonatable | 88 |

A. S. T. M., D-158 Engler:

| | |
|---|---|
| I. B. P. °F | 647 |
| 5 °F | 682 |
| 50 °F | 715 |
| 90 °F | 760 |
| 95 °F | 775 |
| F. B. P. °F | 779 |
| Refractive index at 23° C | 1.4900 |
| Viscosity at: | |
| −10° C centipoises | 2800 |
| 20° C do | 280 |
| 40° C do | 78 |
| 80° C do | 18 |
| Aniline point °C | 69 |
| Pour point °F | −25 |

As mentioned above, the condensation reaction between the alkbenzyl halides and the tertiary-amine is carried out in the presence of a solvent. Suitable alcohol solvents include aliphatic alcohols containing not more than 4 carbon atoms, hexylene glycol, ethylene glycol and glycerol.

Theoretically the condensation reaction between the halide and the amine may be carried out on a mole per mole ratio, however, for best results I prefer to use a slight excess of an amine.

The actual temperature employed in the condensation reaction is not critical and may vary from 30 to 70° C. As to the time of reaction that may vary from ¼ to 3½ hours. In view of the fact that the particular reactants used may be selected from a large list and since the best operating temperature depends largely upon the specific reactants used, it is apparent that the temperature may be varied widely. It is to be understood, however, that higher or lower temperatures may be used than those specified above with a resultant increase or decrease in reaction rate in accordance with the general law of chemical reactions.

The products of the present invention are neutral or slightly alkaline and have pH's in the range of 7 to 8.5 and are germicidally effective without further treatment. Another advantage of the present process lies in the fact that the tertiary-amine reactant is substantially utilized in my process, the yield of the quaternary ammonium halide is high and the product is greatly improved both as to germicidal activity, odor and stability upon storage as contrasted to similar products prepared by the prior art processes.

In order to disclose the nature of the present invention still more clearly the following illustrative examples will be given in which parts are parts by weight.

EXAMPLE 1

Preparation of dodecylbenzyl chloride 36 parts of paraformaldehyde was added to 38 parts of methyl alcohol and the resulting mixture was added to a Pfaudler reaction vessel equipped with an agitator, a condenser for reflux purposes, and a hydrogen chloride absorption trap. After cooling the methanolic paraformaldehyde mixture to 5° C., 55 parts of phosphorus trichloride was added over a period of 20 minutes and then 146 parts of 100 percent sulfuric acid was added slowly with cooling. After all the sulfuric acid had been added, 246 parts of dodecylbenzene was added rapidly. During this period the temperature was maintained below 30° C. The resulting mixture was then heated to 50° C. and maintained within the range of 35 to 60° C. for a period of 2 hours. At the end of this period the mixture was cooled, allowed to settle into two phases, an upper and lower phase. The lower phase was withdrawn and discarded. The upper phase was washed with hot water and then with a dilute aqueous sodium bicarbonate solution and then finally dried over sodium sulfate. After filtering there was obtained 285 parts of a clear bright yellow liquid product analyzing 10.5 percent chlorine.

EXAMPLE 2

Preparation of methyldodecylbenzyl chloride

Example 1 was repeated with the exception that 200 parts of dodecyltoluene was used in place of 246 parts of dodecylbenzene. There was obtained 230 parts of clear bright pale yellow product analyzing 10.86 percent chlorine.

EXAMPLE 3

Preparation of polydodecylbenzyl chloride

Example 1 was repeated with the exception that 350 parts of polydodecylbenzene was used in place of 246 parts of dodecylbenzene. There was obtained 350 parts of the desired product.

EXAMPLE 4

200 parts of dodecylbenzyl chloride prepared according to Example 1, 110 parts water and 20 parts sodium tetraborate (borax) were thoroughly mixed in a reaction vessel. The reaction mixture was then warmed to about 50 to 60° C. and then 192 parts of an 18 to 20 percent aqueous trimethyl amine was slowly added thereto over a period of 30 minutes. The mixture was agitated for an additional 30 minutes at a temperature of from 70 to 80° C. after which it was cooled and diluted with 50 percent ethanol. The ethanol water solution was extracted three times with pentane and the extracted solution was concentrated to 20 to 30 percent by evaporation. The final product was essentially odorless. A 1:1 dilution of this product with distilled water gave a solution which had a pH of 8.4.

EXAMPLE 5

The procedure of Example 4 was repeated in all respects with the exception that 20 parts of sodium acetate was used in place of the sodium tetraborate.

EXAMPLE 6

200 parts of dodecylbenzyl chloride prepared according to Example 1, 110 parts of methanol and 20 parts of sodium tetra borate were added to the reaction vessel. The reaction mixture was warmed with agitation to 50 to 60° C. and then 192 parts of an 18 to 20 percent methanolic trimethyl amine was added slowly thereto over a period of about 30 minutes. The mixture was agitated for an additional 30 minutes at a temperature of 70 to 80° C. after which it was cooled and diluted with 50 percent ethanol. The ethanol water solution was then extracted three times with pentane and the extracted solution concentrated to 20 to 30 percent by evaporation to give a final product which was substantially odorless. Diluting this product with an equal quantity of distilled water gave a solution which had a pH of 8.4.

EXAMPLE 7

The procedure of Example 4 was repeated with the exception that 192 parts of 18 to 20 percent methanolic trimethyl amine was substituted for the 18 to 20 percent aqueous trimethyl amine.

EXAMPLE 8

The procedure of Example 4 was repeated with the exception that 210 parts of methyldodecylbenzyl chloride was substituted for the 200 parts of dodecylbenzyl chloride.

EXAMPLE 9

The procedure of Example 4 was repeated with the exception that 306 parts of polydodecylbenzyl chloride was substituted for the 200 parts of dodecylbenzyl chloride.

EXAMPLE 10

In this example a series of experiments were run in which procedure of Example 4 was followed except triethyl amine, triethanol amine and pyridine were substituted for the trimethyl amine used in that example.

EXAMPLE 11

100 parts of dodecylbenzyl chloride were placed in a glass reaction flask equipped with a reflux condenser. 25 parts of methanol were added. 5 parts of water and 1 part of sodium bicarbonate were then added, following which 24 parts of a 25 percent solution of trimethyl amine in methanol were added slowly with stirring to the reaction mixture. The reaction mixture was refluxed for approximately one hour. The yield of quaternary ammonium chloride was quantitative and used up all the dodecyl-benzyl chloride. The cooled solutions were then diluted with an approximately equal volume of water and extracted three times with petroleum ether. The aqueous portion of these extractions was concentrated by evaporation, following which sufficient distilled water was added to the concentrate to make a 10 percent by weight solution. This particular product upon dilution with hot water developed a strong fishy odor of trimethyl amine after one week's storage.

While particular embodiments of the invention have been described it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for the preparation of stable substantially odorless quaternary ammonium halides which comprises the condensation of an alkbenzyl halide having the general formula:

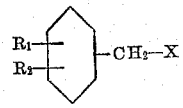

wherein $R_1$, is an alkyl radical, $R_2$ is selected from the group consisting of an alkyl radical and hydrogen, and X is a halogen atom with a tertiary-amine in the presence of a solvent selected from the group consisting of water, alcohol, and solutions of the two and 0.25 to 15 weight percent based on the total weight of the alkbenzyl halide and tertiary-amine present of an alkali metal salt of an acid selected from the group consisting of boric and acetic acids.

2. The process of claim 1 in which the alkbenzyl halide is dodecylbenzyl chloride.

3. The process of claim 1 in which the alkbenzyl halide is methyldodecylbenzyl chloride.

4. The process of claim 1 in which the alkbenzyl halide is polydodecylbenzyl chloride.

5. The process of claim 1 in which the tertiary-amine is trimethyl amine.

6. The process of claim 1 in which the tertiary-amine is triethyl amine.

7. The process of claim 1 in which the tertiary-amine is triethanol amine.

8. The process of claim 1 in which the tertiary-amine is pyridine.

References Cited in the file of this patent

UNITED STATES PATENTS 2,676,987    Lewis et al. _____ Apr. 27, 1954